US006295377B1

(12) United States Patent
Dufaux et al.

(10) Patent No.: US 6,295,377 B1
(45) Date of Patent: Sep. 25, 2001

(54) COMBINED SPLINE AND BLOCK BASED MOTION ESTIMATION FOR CODING A SEQUENCE OF VIDEO IMAGES

(75) Inventors: Frederic Dufaux, Chestnut Hill; Sing Bing Kang, Arlington, both of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/114,684

(22) Filed: Jul. 13, 1998

(51) Int. Cl.[7] .................................................. G06K 9/36
(52) U.S. Cl. .................................................. 382/236
(58) Field of Search .................................. 382/232, 236, 382/237, 238, 240, 242, 248, 250, 151, 154, 180, 194, 294, 295; 348/45, 65, 169, 263, 270, 384, 394, 395, 400–404, 407–416, 420, 421, 425, 429, 430, 431, 459, 699; 600/443, 459, 463; 128/916

(56) References Cited

U.S. PATENT DOCUMENTS

| 4,890,160 | * | 12/1989 | Thomas ................................ 348/429 |
| 5,325,190 | * | 6/1994 | Nagasaki et al. ..................... 348/270 |
| 5,432,543 | * | 7/1995 | Hasegawa et al. ................... 348/699 |
| 5,611,000 | | 3/1997 | Szeliski et al. ....................... 382/294 |
| 5,782,766 | * | 7/1998 | Weng et al. ........................... 600/443 |
| 5,896,176 | * | 4/1999 | Das et al. .............................. 348/416 |
| 6,014,473 | * | 1/2000 | Hossack et al. ...................... 382/294 |
| 6,026,183 | * | 2/2000 | Talluri et al. ......................... 382/237 |

OTHER PUBLICATIONS

Lucas et al., "An Iterative Image Registration Technique with an Application to Stereo Vision" Proceedings of Imaging Understanding Workshop, pp. 121–130, 1981.

Jain et al., "Displacement Measurement and Its Application in Interframe Image Coding" IEEE Transactions on Communications, vol. COM–29 No. 12 pp. 1799–1808; 1981.

Liu et al., "New Fast Algorithms for the Estimation of Block Motion Vectors" IEEE Transactions on Circuits and Systems for Video Technology, vol., 3, No.2, pp. 148–157, 1993.

Srinivasan et al., "Predictive Coding Base4d on Efficient Motion Estimation" IEEE Transactions on Communications, vol. COM–33, No. 8, pp. 888–896, 1985.

Horn et al., "Determining Optical Flow" Artificial Intelligence, vol. 17, pp. 185–203, 1981.

Bierling, "Displacement estimation by hierarchical block-matching" SPIE vol. 1001 Visual Communications and Image Processing; pp. 942–951, 1988.

Szeliski et al., "Hierarchical Spline–Based Image Registration" IEEE Computer Society Conference on Computer Vision and Pattern Recognition, pp. 194–201, 1994.

Dufaux et al., "Mothin Estimation Techniques for Digital TV: A Review and a New Contribution" Proceedings of the IEEE, vol. 83, No. 6, pp. 858–876, 1995.

* cited by examiner

Primary Examiner—Jose L. Couso
(74) Attorney, Agent, or Firm—Hamilton, Brook, Smith & Reynolds, P.C.

(57) ABSTRACT

In an coder for producing a bitstream representative of a sequence of video images, a previous image is registered with a current image using spline-based registration to produce estimated motion vectors. The estimated motion vectors are used to match blocks of the previous image and the current image to produce translation vectors. The translation vectors compensate for motion while encoding the sequence as a bitstream.

8 Claims, 4 Drawing Sheets

COMBINED SPLINE AND BLOCK BASED MOTION ESTIMATION FOR CODING A SEQUENCE OF VIDEO IMAGES

FIELD OF THE INVENTION

The invention relates generally to video coding, and more particularly estimating motion vectors to encode a sequence of video images.

BACKGROUND OF THE INVENTION

Recent advances in digital technology have led to new communication media in which video information plays a significant role. Digital television, high definition TV (HDTV), video-conferencing, video-telephony, medical imaging, and multi-media are but a few examples of emerging video information applications.

When compared with text or audio media, video media require a much larger bandwidth, and therefore would benefit more from compressing data having redundancies. In the framework of video coding (encoding and decoding), statistical redundancies can be characterized as spatial or temporal. Due to differences in the spatial and temporal dimensions, the compressing of the data is usually handled separately.

Coding that reduce spatial correlations are referred to as intraframe coding, whereas interframe coding reduces temporal redundancies. Compared to static images where only spatial redundancies need to be considered, coding of a sequence of images over time requires a more efficient method.

In any case, the compressed bitstream that is produced by the encoding takes less memory to store, and less time to transport. A decoder can later be used to recover the original image sequence. Together encoders and complementary decoders are known as codecs.

As stated above, encoding is done by reducing temporal and spatial redundancies in the image sequence. A number of standards are known for video coding, e.g., MPEG-1, MPEG-2, MPEG-4, and H.263. However, these standards only define the syntax and semantic of the compressed bit stream. The methods used to produce the bitstream are not specified. In other words, the above standards specify how the bitstream should appear so that decoders will operate properly, but not on the details of how the bitstream is actually produced in the first place.

One frequently used aspect of video coding partitions the pixels of video images or "frames" into "blocks." The optical flow or "motion" of the pixels in the blocks is analyzed to estimate motion information. Compression is achieved, for example, by sending a block once, and then sending the motion information that indicate how the block "moves" in following frames.

The known standards, e.g., MPEG-1, MPEG-2, MPEG-4 and H.263, constrain the motion information to a half-pixel accuracy translation vector per macroblock or block of pixels. A macroblock is 16×16 pixels, a block is 8×8 pixels; however, the standards do not specify how to estimate the translation vector for the 16×16 macroblocks or 8×8 blocks.

Block matching is the classical method to estimate translation motion in video coding, please see Dufaux et al. "Motion estimation technique for digital TV: a review and a new contribution," Proc. of the IEEE, Vol. 83, No. 6, pp. 858–876, June 1995. There, a macroblock in the current image is matched with a macroblock in the previous reference image to minimize a disparity measure expressed as a prediction error signal.

More specifically, using the notation I(r, t) for an image I at pixel r and time t, W the measurement window, e.g., all the pixels in a macroblock, and S the search window, a translation vector d is obtained by:

$$d = \arg \min_{d \in S} \sum_{r \in W} \|I(r, t) - I(r - d, t - \Delta t)\|$$

where the most widely used distance measures are the quadratic norm $\|x\| = x^2$, and the absolute value $\|x\| = |x|$. The latter is usually preferred due to its lower computational complexity.

In full-search block matching, an exhaustive search of all discrete candidate displacements within a maximum displacement range is performed.

This method is guaranteed to reach the global minimum for the matching criterion at the cost of high computational complexity.

Indeed, the maximum displacement for normal video sequences is typically ±15 or ±31 pixels, hence requiring the evaluation of the matching criterion at $(2*15+1)^2=961$ or $(2*31+1)^2=3969$ positions. Furthermore, although the resulting motion vectors minimize the prediction error signal, they may not represent the true motion in the sequence of images.

Because it takes fewer bits to transmit a zero motion vector, the displacement (0, 0) is usually favored during the estimation process. More precisely, the disparity measure is reduced by a fixed number, e.g., 100 when using the absolute value as a norm when computing the disparity of a zero displacement.

The above method results in one-pixel accuracy motion vectors. However, by interpolating the reference image at half-pixel locations, the method can straightforwardly be extended to half-pixel accuracy motion vectors. In practice, one-pixel accuracy motion vectors are first estimated, the one-pixel motion vectors are then refined to half-pixel precision by searching the eight closest half-pixel locations.

The MPEG-2 Test Model, and the MPEG-4 Verification Model are based on the above full-search block matching technique with half-pixel refinement, respectively see ISO-IEC/JTC1/SC29/WG11, "MPEG-2 Test Model 4," 1993, and ISO-IEC/JTC1/SC29/WG11, "MPEG-4 Verification Model 9," 1998.

Fast search techniques have been proposed to reduce the computational complexity of the full-search technique, see Jain et al., "Displacement measurement and its application in interframe image coding," IEEE Trans. Commun., Vol. COM-29, pp. 1799–1808, December 1981, Koga et al., "Motion compensated interframe coding of video conferencing," Proc. Nat. Telecommun. Conf., New Orleans, La., December 1981, pp. G5.3.1–G5.3.5, Srinivasan et al., "Predictive coding based on efficient motion estimation," IEEE Trans. Commun., Vol. COM-33, pp. 888–896, August 1985, and Liu et al., "New fast algorithm for the estimation of block motion vectors," IEEE Trans. Circ. and Syst. for Video Tech., Vol. CSVT-3, No. 2, pp. 148–157, April 1993. However, using these techniques, convergence toward the global minimum is no longer guaranteed.

The above methods deal with images at a single resolution scale. To reduce computational complexity, and to take into account the multi-scale nature of the motion in a scene, hierarchical and multigrid block matching techniques for block-based motion estimation have also been proposed, see Bierling, "Displacement estimation by hierarchical block matching," SPIE Proc. Visual Commun. and Image Process.'88, Cambridge, Mass. November 1998, Vol. 1001, pp. 942–951.

While block matching motion estimation techniques are the most widely used in the field of video coding, other methods have been proposed for image sequence analysis. Notably, gradient techniques are widely used in computer vision, see Horn et al., "Determining optical flow," Artif. Intell., Vol. 17, pp. 185–203, 1981, and Lucas et al., "An iterative image registration technique with application to stereo vision," Proc. Image Understanding Workshop, pp. 121–130, 1981. Although these methods are efficient to estimate the motion in the scene, they do not always perform well in minimizing the prediction error signal.

Therefore, it is desired to provide a method for producing motion estimates that is computationally effective, has a high visual quality, while at the same time reduces prediction errors.

SUMMARY OF THE INVENTION

The invention first estimates a motion field using spline-based registration. By rounding local motion vectors of this initial field to the closest integer, a one-pixel accuracy translation vector is derived for each macroblock in the image. The resulting translation vectors are then refined within a small search window using block matching. Finally, half-pixel accuracy estimation is applied as post-processing.

DETAILED DESCRIPTION OF THE PREFERRED EMBODIMENT

Introduction

Our invention combines spline-based image registration with block matching to estimate motion vectors. Our invention takes advantage of the low complexity and coherent motion fields resulting from a spline-based registration stage, and the robustness of block matching motion estimation.

Video Coder Structure

Figure 1:
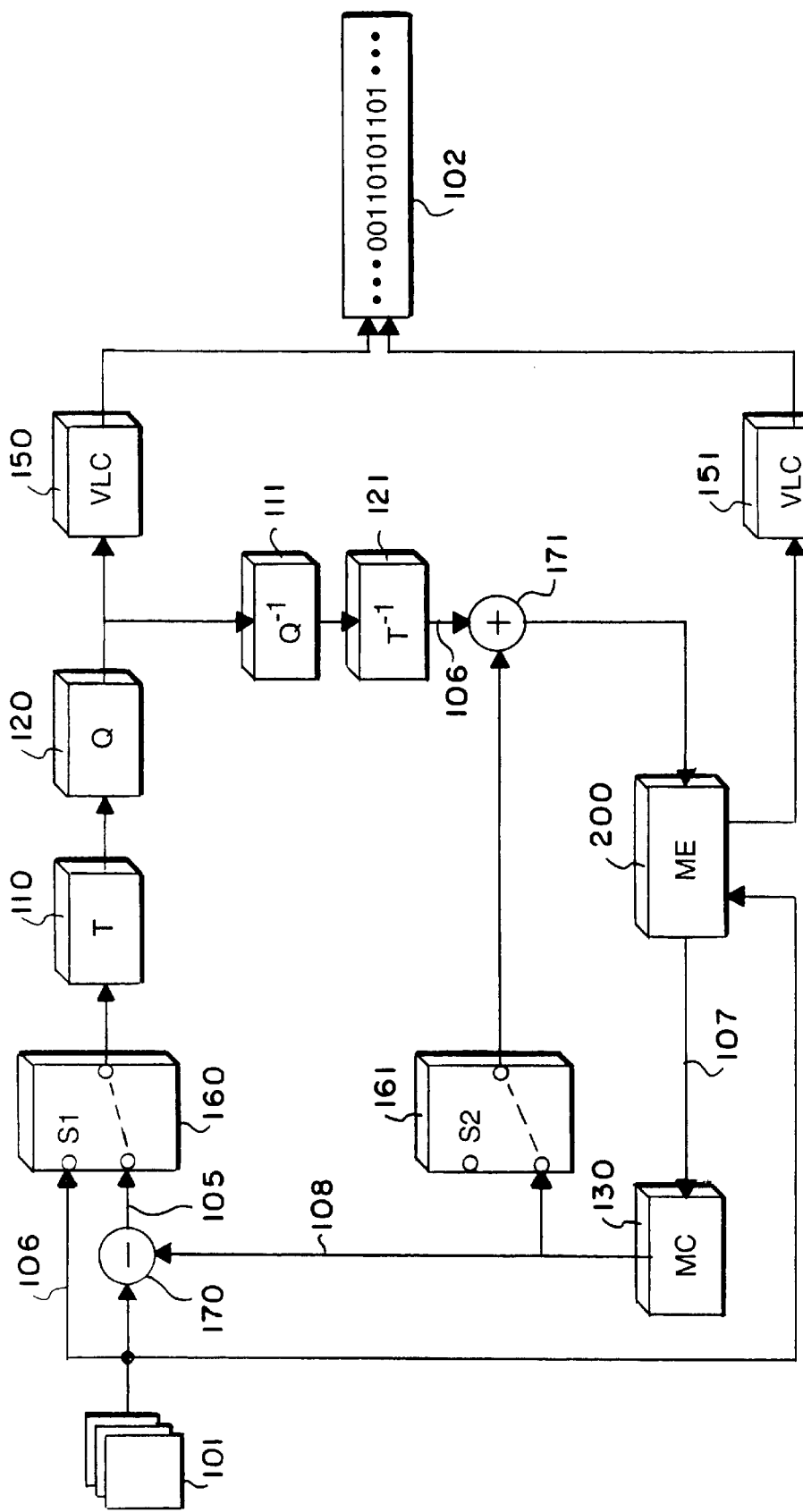
FIG. 1 is a block diagram of a coder that estimates motion in a sequence of video images according to the invention.

FIG. 1 shows a motion compensated (MC) discrete cosine transform (DCT) coder 100 that uses the invention. The coder 100 can be used to encode a sequence of digital images 101 to produce a MPEG-1, MPEG-2, MPEG4, or H.263 compatible bitstream 102.

The coder 100 includes a transform (T) 110, a quantizer (Q) 120, and their inverses $T^{-1}$ 121 and $Q^{-1}$ 121. The transform 110 and quantizer 120 perform encoding, and their inverses 111 and 121, together with motion compensation (MC) 130 essentially perform as a decoder.

Variable length coders (VLC) 150 and 151 generate the compressed bitstream 102. Switches S1 160 and S2 161 determine if spatial "intraframe" or temporal "interframe" coding should be used. Differencing 170 and adding 171 functions are also provided.

The motion estimation 200 according to our invention is described in greater detail below.

Video Coder Operation

During operation of the coder 100, the sequence of images 101 is processed as follows. A previous image is differenced 170 with a current image to produce an "error" signal on line 105. Switch S1 160 select whether intra- or intraframe coding should be done. For interframe coding, as shown, the error signal on line 105 is used, otherwise for intraframe coding the current image on line 160 is used. In any case, some transform 110 is applied on the output signal from the switch S1, and the transformed signal is quantized before variable length coding.

The output of the quantizer 120 is decoded (111, 121) and added (171) to the output signal of switch S2 161. In the case of intraframe coding, there is no output from the switch S2. The motion estimation 200 according to our invention yields translation vectors on line 107. The translation vectors are used to compensate the previous frame and to generate a predicted error signal on line 108. The predicted error signal is fed back to the differencing function 170 to complete the loop.

In the coder 100, the motion compensation 130 reduces temporal redundancies in the image sequence 101, while the discrete cosine transform reduces spatial redundancies. The motion compensation 130 relies on the motion estimation 200 to estimate the motion between consecutive frames in the sequence 102. Thus, in a decoder which receives the bitstream 102, a next frame can be predicted from previous frames and motion vector information.

None of the above video coding standards specify how the motion estimation 200 should be done even though motion estimation is a very important component of the coder 100. In particular, the performance of the motion estimation 200 is critical in achieving very high coding efficiency. Furthermore, the motion estimation 200 is one of the most computationally intensive task in the coder 100.

Motion Estimation

Spline-based Registration

Figure 2:
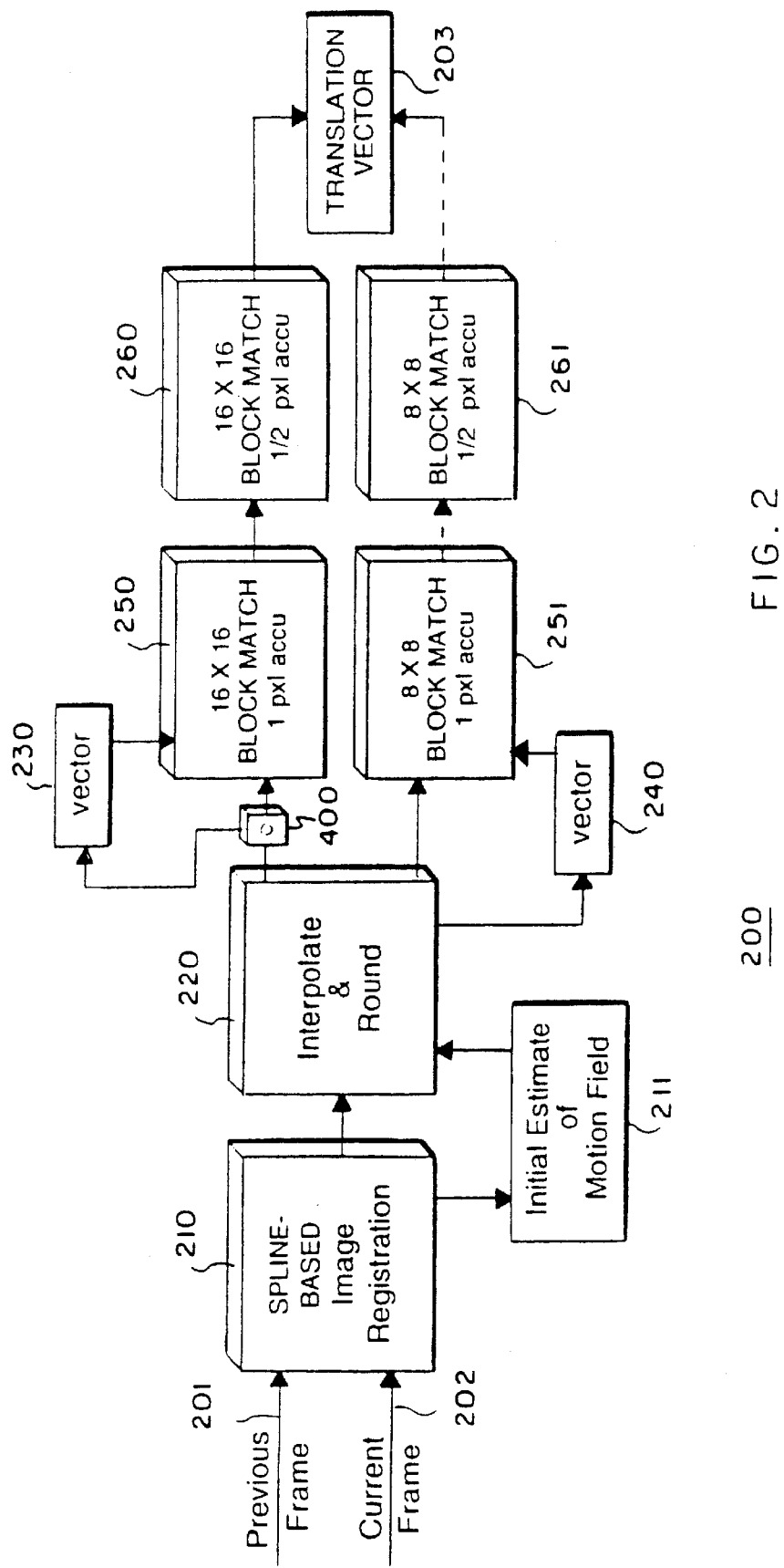
FIG. 2 is a block diagram of a method that combines spline-based registration with block-based matching to produce motion estimates for the coder of FIG. 1.

FIG. 2 shows a high level diagram of a motion estimation method 200 according to our invention. In FIG. 2, dotted paths are optional. Spline-based image registration 210 is applied to a previous image frame 201 and a current frame 202 to obtain an initial estimate of a motion field 211. By interpolating and rounding (220) the initial field 211, one-pixel accuracy motion vectors 230 are then derived for each 16×16 macroblock in the image. Vectors 240 can similarly be obtained for 8×8 blocks. In step 400 as described in greater detail below, zero displacements vectors are favored.

Block Matching

The resulting vectors 230 are used as initial estimates for block matching 250. As an advantage with our invention, spline-based registration produces coherent motion, so a small search window is sufficient at this stage, as the initial estimates 211 are expected to be close to the solution. Finally, a half-pixel accuracy refinement is performed in step 260.

If the syntax of the coder 100 supports the transmission of four motion vectors, then the motion estimation on vectors 240 can match 8×8 blocks in step 251 and refine the estimates to ½ pixel accuracy in step 261.

The method 200 generates one half-pixel accuracy translation vector 203 for each macroblock or block. Therefore, our invention can be used in conjunction with video coding standards such as MPEG-1, MPEG-2, MPEG-4 and H.263.

The spline-based registration approach is described in U.S. Pat. No. 5,611,000 "Hierarchical spline-based image registration" issued to Szeliski on March, 1997, also please see Szeliski et al., "Hierarchical spline-based image registration," Proc. IEEE Computer Society Conference on Computer Vision and Pattern Recognition, Seattle, Wash, pp. 194–201, June 1994.

Details of Spline-based Registration

In spline-based registration, the 2-D motion field is represented as 2-D splines controlled by a smaller number of displacement estimates at nodes in a spline control grid. Spline-based registration uses a gradient technique based on pixel intensities to estimate the displacement of grid nodes.

More precisely, a fixed size rectangular grid is overlaid on the current frame. In the preferred embodiment of the invention, a grid size of 16 is chosen in order to match the macroblock structure used in the coder 100. Note that the spline control grid can be of any pattern, regular or not.

The displacement of each node of the grid with respect to the previous frame is then estimated. Note, the motion that is estimated in the coder is backward because ultimately the purpose is to predict the current frame from the previous frame in the decoder.

The estimation is based on an iterative gradient descent process. To decrease computational complexity and improve convergence, the process is applied on a hierarchical pyramid of multiple image resolutions. The local connectivity of nodes is preserved throughout i.e., no foldovers or breaks, and the motion of any pixel within a patch is basically a linear combination of the motion at the nodes. As a result, the estimated motion field is smooth. To further improve the convergence of the algorithm, the motion parameters obtained for the previous frame or frames can be used as initial estimates for the current frame.

Displacement Fields

Figure 3:
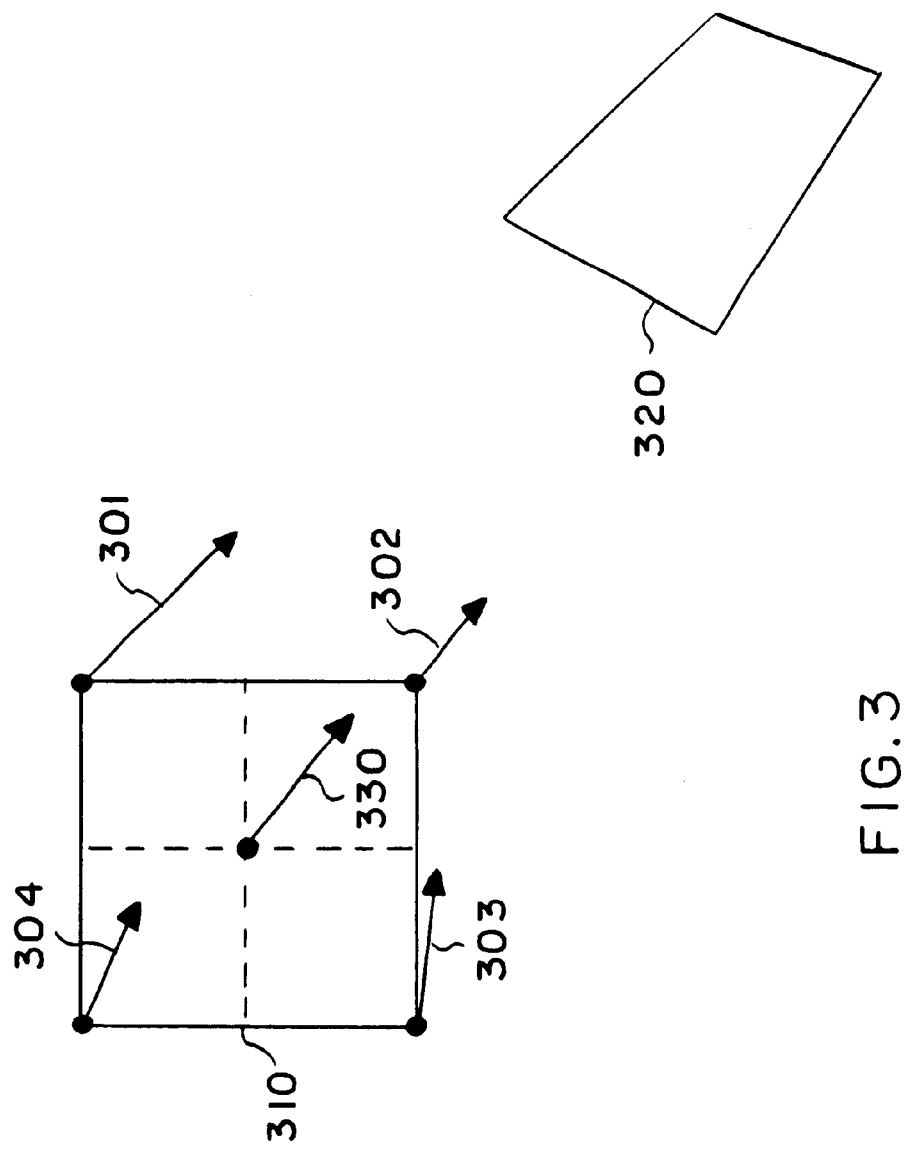
FIG. 3 is a block diagram showing a current spline cell and the corresponding warped previous spline cell according to motion vectors.

As shown in FIG. 3, displacement fields 301–304 obtained by the above process define the transformation associating the rectangular grid (cell) 310 of the current frame 202, and a corresponding warped grid or cell 320 in the previous frame 310. In FIG. 3, the dashed lines partition the macroblock into four blocks.

From the displacement field of the nodes, a dense motion field 330 can be interpolated at position (0, 0) of the macroblock. More precisely, as mentioned above, the motion field of any pixel in the macroblock can be computed as a linear combination of the displacement of the four surrounding nodes.

Because the spline-based registration 210 is based on gradient descent, the precision of each node displacement is a floating point value. As a result, the precision of the dense interpolated motion field is also a floating point value. Furthermore, there are no limitations on the largest displacement which can be estimated, although the method may not converge correctly in case of very large displacements.

After the estimated field resulting from the spline-based registration 210 are obtained, the next step is to compute a block-based translation motion vector for each macroblock in the image, and optionally for each block in the image if the syntax of the video codec supports this mode, e.g., MPEG-4 and H.263.

Refining Motion Vectors and Favoring Zero Displacement Vectors

Figure 4:
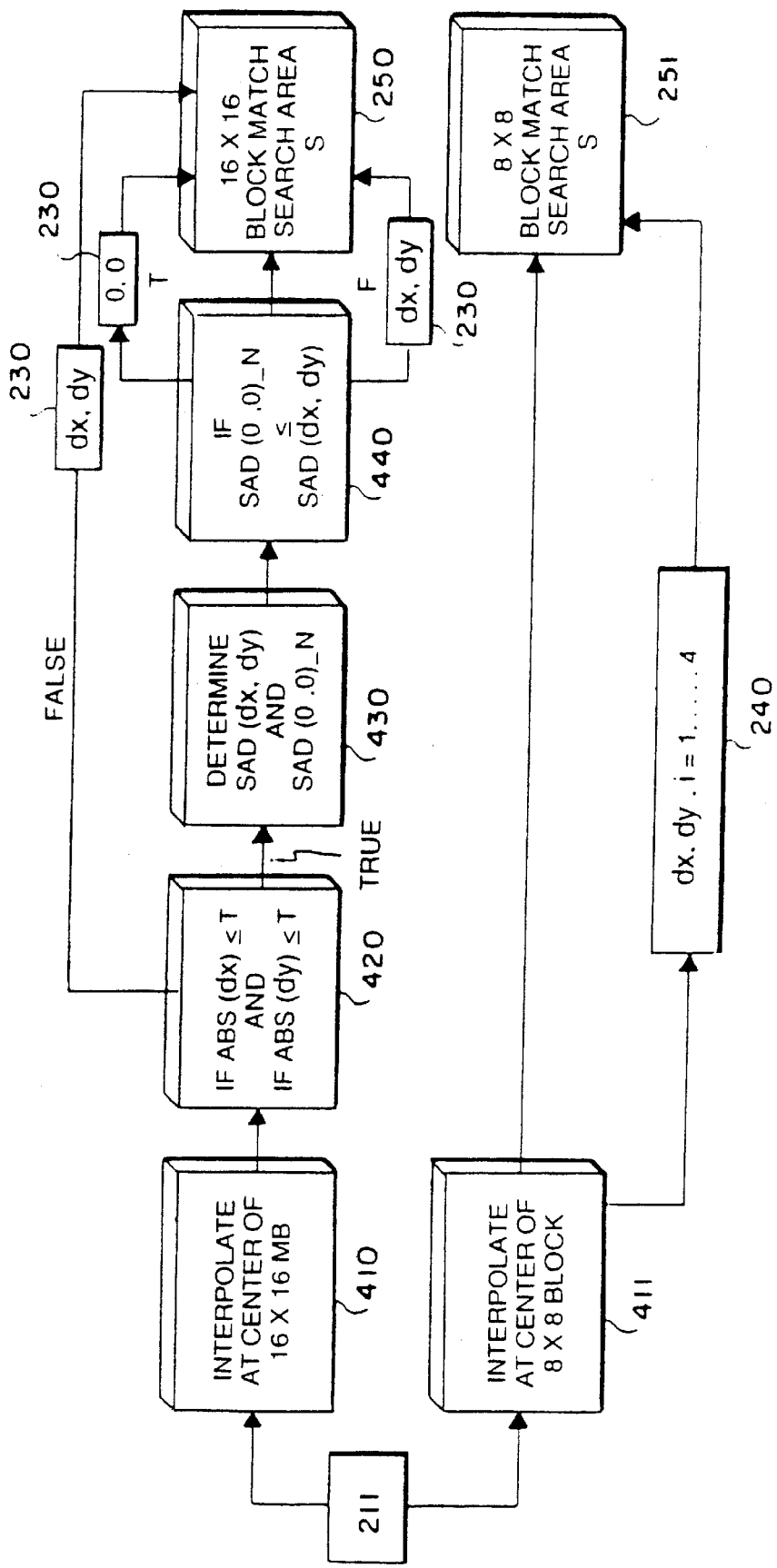
FIG. 4 is a flow diagram of a process for refining the estimated motion vectors.

FIG. 4 shows the steps of refining the estimated motion field 211 produced by spline-based registration. First, as stated above the motion vector of the pixel located at the center of the macroblock (or block), is simply obtained by a linear combination of the displacement of the four surrounding nodes in step 410 or 411.

The macroblock motion fields can be denoted as d=(dx, dy). The four block motion vectors are referred to as $d_i=(dx_i, dy_i)$, where i=1, . . . , 4 is the block index in the macroblock. The resulting floating point value is rounded to the closest integer.

Because zero motion vectors take less bits to encode, these are "favored." Steps 420, 430 and 440 test for potential zero motion vectors, see block 400 in FIG. 2. Step 420 can first determine if d(x)=d(y)=0. If so, steps 430 and 440 can be skipped. Otherwise if not, determine ABS(dx)<=T and ABS(dy)<=T, where T is typically 1. Step 430 determines the sum of absolute differences SAD(dx, dy) and SAD(0, 0)-N, where (0, 0) denotes the dense motion vector 330 of FIG. 3. In step 440, compare SAD(0, 0)-N and SAD(dx, dy) as SAD(0, 0)-N<=SAD(dx, dy), where N is typically 100. The value N applies a skew. If the last condition is true, the motion vector (dx, dy) is set to zero, and otherwise it is left as (dx, dy).

The block matching motion estimation is then performed in a search area S around (dx, dy) in step 250 (or 251). If the search area S includes the (0, 0) location, then the disparity measure for the latter is reduced by N. Note that the disparity measure at the locations (0, 0) and (dx, dy) may already have been estimated at the previous step; in this case it is not necessary to recompute them. As (dx, dy) is expected to be close to the optimal solution due to our spline-based registration, a small search area is sufficient at this stage.

In a preferred embodiment of the invention, S is a ±2 pixel area around (dx, dy). To further reduce computational complexity at the cost of slightly less efficient motion estimation, this stage can be omitted altogether.

Optionally, a half-pixel accuracy refinement can be applied in step 260 (or 261) using block matching technique. The reference image is interpolated at half-pixel location, and the eight closest half-pixel locations are searched. This stage is identical to the one applied in the MPEG-2 Test Model or the MPEG-4 Verification Model.

If the syntax of the video coder supports four motion vectors per macroblock, e.g., MPEG-4 and H.263, the coder 100 selects whether to transmit one or four motion vector for each macroblock. Methods for determining the optimal mode selection are known in the art, see the MPEG-4 verification model.

Our invention produces macroblock-based or block-based translation motion vectors with half-pixel accuracy. The invention can be used in MPEG- 1, MPEG-2, MPEG-4, and H.263 compliant coders for motion estimation because the syntax of the resulting motion field is compatible with those standards.

It should be noted, our invention can also be used for other types of encodings that not necessarily use discrete cosine transforms, e.g., blocks 110 and 120 (and their inverses) can be other types of transforms. The key idea is estimating motion by first doing spline-based registration and then block matching. The invention can also be used for other types of applications where motion analysis is done, such as, image sequence filtering and restoration.

Advantages

Our invention reduces the computational complexity associated with complete block matching while retaining its good prediction characteristics during video encoding. This is accomplished by replacing the compute-intensive initial gross block-based search with spline-based registration, which is more efficient in recovering coherent full-image motion fields.

The efficiency of the spline-based registration method stems from implicit relative motion constraints between the spline nodes. In addition, these constraints result in a smooth motion field, which can be more efficiently encoded. The block matching is optimal in minimizing the prediction error. However, it is computationally very expensive when applied on a large search area, and the resulting motion vectors may not be representative of the true motion in the scene.

By combining both methods, we exploit the best of each. Using spline-based registration to initially estimate the motion vectors is computationally effective. Furthermore, the smooth motion vectors require significantly fewer bits to encode. It also guarantees a high visual quality. Subsequently applying a block matching technique allows us to further reduce the prediction error. As a very small search area is used at this stage, computational complexity remains low.

At low or high bit rate and on slow-motion sequences, e.g., video-conferencing, the small saving on the motion vectors bits offsets the small increase on the texture coding bits due to less accurate prediction. The invention typically results in similar coding performance for a significantly lower complexity.

At low bit rate and on moderate-high-motion sequences, motion vectors represent a large percentage of the total bit rate. In this case, the invention results in an important saving on the motion vectors bits for a small increase of texture bits. Therefore, the invention achieves higher coding performance on top of a significantly lower complexity.

At high bit rate and on moderate-high-motion sequences, motion vectors represent only a small fraction of the overall bit rate. In this case, the saving on the motion vectors bits may not compensate for the increased bits for texture coding. Therefore, the invention results in similar to lower coding performance, but still requires a significantly lower complexity.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

We claim:

1. A method for estimating motion in a sequence of images, comprising the steps of;

registering a previous image with a current image using 2-D splines created by a gradient technique based on pixel intensity to estimate the displacement of grid nodes and to produce estimated motion vectors; and matching blocks of the previous image and the current image using the estimated motion vectors to establish a search starting point and to reduce a search area to produce translation vectors.

2. The method of claim 1 including compensating for motion between the previous frame and the current frame using the translation vectors.

3. The method of claim 1 including compensating for motion while encoding of a video sequence.

4. The method of claim 1 including compensating for motion while restoring images of the sequence.

5. The method of claim 1 including compensating for motion while filtering images of the sequence.

6. The method of claim 1 including interpolating and rounding the estimated motion vectors.

7. The method of claim 1 including:

determining if the estimated motion vectors are less than a predetermined threshold;

determining the sum of absolute differences for the estimated motion vectors and a dense motion vector;

setting the estimated motion vectors to zero when the dense motion vector minus a skew is less than the sum.

8. An apparatus for estimating motion in a sequence, of images, comprises:

means for registering a previous image with a current image using 2-D splines created by a gradient technique based on pixel intensity to estimate the displacement or grid nodes and to produce estimated motion vectors; and means for matching blocks of the previous image and the current image using the estimated motion vectors to establish a search starting point and to reduce a search area to produce translation vectors.

* * * * *